(12) United States Patent
Primel et al.

(10) Patent No.: US 6,518,393 B2
(45) Date of Patent: Feb. 11, 2003

(54) POLYMERIZABLE COMPOSITIONS FOR MANUFACTURING TRANSPARENT POLYMERIC SUBSTRATES, RESULTING TRANSPARENT POLYMERIC SUBSTRATES AND THEIR APPLICATIONS IN THE OPTICAL FIELD

(75) Inventors: Odile Primel, Vincennes (FR); Maxime Pillie, Paris (FR); Gilles Richard, Quincy Voisins (FR); Leanirith Yean, Longjumeau (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/876,280

(22) Filed: Jun. 6, 2001

(65) Prior Publication Data

US 2002/0115819 A1 Aug. 22, 2002

Related U.S. Application Data

(63) Continuation of application No. PCT/FR00/02771, filed on Oct. 5, 2000.

(30) Foreign Application Priority Data

Oct. 6, 1999 (FR) .............................. 99 12459

(51) Int. Cl.$^7$ ............... C08G 75/04; C08F 283/00
(52) U.S. Cl. .................. 528/375; 528/373; 525/535; 525/212
(58) Field of Search ............... 528/375, 373; 525/535, 212

(56) References Cited

FOREIGN PATENT DOCUMENTS

| EP | 0745621 | 12/1996 |
| WO | WO 96/26184 | 8/1996 |
| WO | WO 96/38486 | 12/1996 |

OTHER PUBLICATIONS

International Search Report dated Jan. 4, 2001.

*Primary Examiner*—Duc Truong
(74) *Attorney, Agent, or Firm*—Fulbright & Jaworski L.L.P.

(57) ABSTRACT

The compositions comprise:
 (a) at least 40 parts by weight, preferably at least 50 parts by weight, of at least one thio(meth)acrylate monomer,
 (b) at least one high Abbe number monomer,
 (c) at the most 20 parts by weight, preferably at the most 15 parts by weight and more preferably 10 parts by weight of an aromatic polyvinyl monomer, and
 (d) at least one polythiol, for 100 parts by weight of (a), (b), (c) and (d).

Application for the manufacture of optical lenses.

26 Claims, No Drawings

POLYMERIZABLE COMPOSITIONS FOR MANUFACTURING TRANSPARENT POLYMERIC SUBSTRATES, RESULTING TRANSPARENT POLYMERIC SUBSTRATES AND THEIR APPLICATIONS IN THE OPTICAL FIELD

This application is a continuation of PCT Application No. PCT/FR00/02771 filed Oct. 5, 2000, which claims priority to French Application No. 99 12459 filed Oct. 6, 1999.

This invention relates to the field of polymerizable monomer compositions which, after polymerization, provide transparent polymeric substrates, and their use for manufacturing optical lenses, more particularly ophthalmic lenses.

Polymerizable compositions have already been disclosed for the manufacture of ophthalmic lenses having a high refractive index.

Compositions comprising a polyoxyalkyleneglycol di(meth)acrylate monomer, a monomer containing a bisphenol-A pattern and leading, through homopolymerization, to a polymer having a higher refractive index than 1.55 and a urethane monomer having 2 to 6 (meth)acrylic end groups are disclosed in EP-A-453,149.

Polymerization is preferably a mixed UV/thermal one.

The patent application EP-745,621 discloses a photopolymerizable composition comprising:

a) 10% to 70% of a bis-2-[(meth)acryloylthioethyl] sulfide or a mixture thereof with the bis [(meth)acryloylthiophenyl]sulfide,
b) 10% to 60% by weight of at least one poly(ethoxy) bisphenol-A di(meth)acrylate type monomer,
c) 5% to 30% by weight of at least one aromatic or polycyclanic mono(meth)acrylate monomer,
d) 0 to 15% by weight of a polyalkyleneglycol di(meth)acrylate, and
e) 0 to 10% by weight of a polythiol.

Patent specification WO 96/38486 discloses polymerizable compositions for the manufacture of optical lenses with a high index and a high Abbe number, comprising 20% to 60% by weight of an acrylate or methacrylate monomer derived from a polycyclic olefin, more particularly a tricyclodecane acrylate or methacrylate derivative, 15% to 60% by weight of a di- or polythiol, 5% to 50% by weight of a divinyl or polyvinyl monomer, and 0 to 20% by weight of a polymerizable comonomer that can be selected amongst methacrylates, acrylates, thiomethacrylates, thioacrylates, vinyls, vinylethers, allyls, epoxides and the like.

The optical items produced from such compositions have high refractive indices up to 1.6 or more and Abbe numbers of 38 or higher.

Although it is mentioned that the polymerizable compositions disclosed in this document can be polymerized thermally and/or by UV radiation, all the embodiments mention a thermal curing step, the time period of which is particularly long (8 hours).

A polymerizable composition for the manufacture of ophthalmic lenses, which comprises 2.5% to 100% of a divinyl ester cyclic monomer, 5% to 30% by weight of a di- or polythiol monomer and, optionally, 1% to 40% by weight of a thiodiacrylate or dimethacrylate monomer, is described in patent specification WO 97/44372.

As it is thus appreciated, numerous polymerizable compositions have been offered in the prior art, leading to materials with a refractive index of 1.6 or higher, without being totally satisfactory in a view to obtaining transparent polymeric substrates, for use in the optical field.

Thus, a first object of this invention aims at providing new polymerizable monomer compositions leading to transparent polymeric substrates.

In particular, the optical substrates must show the following set of features:

a high transparency (transmission being generally higher than 85%, and preferably, higher than or equal to 90%), without or with a very little light diffusion, a low density lower than 1.4, preferably lower than 1.3, and more preferably lower than 1.2, a refractive index in the range of 1.55 to 1.60, a high Abbe number, in the range of 35 to 45, in order to avoid chromatic aberrations, a lack of colour after polymerization, in particular a low yellow index and a lack of yellowness in the course of time, a good impact resistance (in particular, the uncoated glass should preferably successfully satisfy the ball fall FDA test), a good resistance to the action of static stresses, a good abrasion resistance, a good ability to several treatments (hard coating deposit, anti-reflection, adhesion and/or anti-shock primers,...), and in particular a good colouration capacity, a good ability to surfacing and projecting treatments, without the glass global geometry being altered during these operations, and a low water absorption rate.

A second object of this invention aims at providing compositions that could be easily and rapidly polymerized, in particular they could be polymerized with photopolymerization techniques or mixed photopolymerization and thermal polymerization techniques allowing to reduce the cycle periods for the lens manufacture.

The polymerizable monomer composition according to the invention comprises:

(a) at least 40 parts by weight, preferably at least 50 and more preferably 55 parts by weight of at least one thio(meth)acrylate monomer,
(b) at least one high Abbe number monomer,
(c) at the most 20 parts by weight of an aromatic polyvinyl monomer, and
(d) at least one polythiol, for 100 parts by weight of (a), (b), (c) and (d).

The aromatic polyvinyl monomer typically represents 0.5 to 10 parts by weight, preferably 1 to 5 parts by weight based on 100 parts by weight of (a), (b), (c) and (d).

Preferably, the high Abbe number monomer(s) represent(s) 10 to 40 parts by weight, more preferably 10 to 30, and the polythiol 5 to 20 parts by weight for 100 parts by weight of the mixture of monomers (a), (b), (c) and (d).

Preferably, the polythiol represents at the most 20 parts by weight and more preferably, at the most 15 parts for 100 parts by weight of (a), (b), (c) and (d).

Moreover, the polymerizable compositions may include for 100 parts of the mixture of monomers (a), (b), (c) and (d), up to 30 parts by 35 weight of at least another copolymerizable monomer, different from the monomers of (a), (b), (c) and (d). Preferably, the other polymerizable comonomer represents no more than 20 parts by weight and more preferably, no more than 10 parts by weight for 100 parts of the mixture of monomers of (a), (b), (c) and (d). Preferably, such other copolymerizable monomer is a radical copolymerizable monomer.

One of the advantages of the invention lies in that such compositions may be easily and rapidly photopolymerized.

The monomer or the mixture of monomers for the component (a) of the composition according to the invention encompasses any monomer comprising at least one thioacrylate or thiomethacrylate function.

In the present description and claims, it is understood by a thio(meth)acrylate function a functional group of the formula:

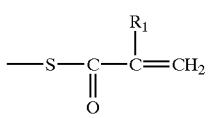

wherein $R_1$ is H or —$CH_3$.

Preferably, the monomers of the component (a) have the following formula:

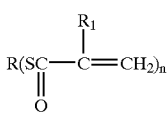
(I)

wherein:

R is a linear or branched, monovalent or polyvalent aliphatic hydrocarbon radical, or a monovalent or polyvalent aromatic group, directly linked to the sulfur atom of the thio(meth)acrylate group(s) with an aromatic ring or by means of a linear alkyl chain, said R radical being able to include in its chain one or more groups selected amongst

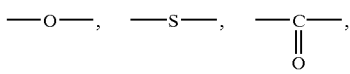

$R_1$ is hydrogen or —$CH_3$, and
n is an integer from 1 to 6, preferably from 1 to 3.

The monovalent R radicals may include a linear or branched $C_1$–$C_5$ alkyl group, the radicals of the formula:

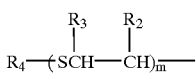

wherein:
  $R_2$ and $R_3$ are, independently from one another, H or a linear or branched $C_1$–$C_5$ alkyl radical,
  $R_4$ is a linear or branched $C_1$–$C_5$ alkyl radical, a $C_7$–$C_{10}$ aralkyl radical or a $C_6$–$C_{12}$ aryl radical, optionally substituted, in particular with alkyl and/or halogen groups, and
  m is an integer from 1 to 4.

The preferred monovalent R radicals may include:
$C_2H_5SCH_2CH_2$—

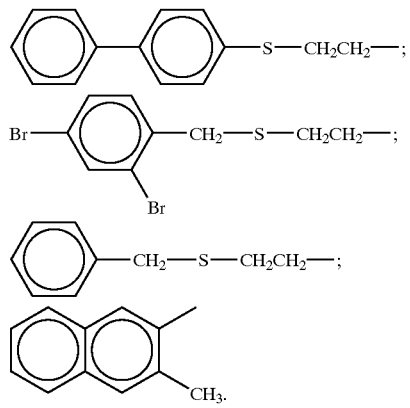

Monomers of formula (I) in which n=1 and such as defined hereabove, are disclosed, amongst others, in U.S. Pat. No. 4,606,864, JP-63,316,766 and EP-A-0,384,725.

The divalent R radicals which fall within the scope of the monomers of formula (I) may include the linear or branched $C_2$–$C_{10}$ alkylene radicals that can include in their chain one or more

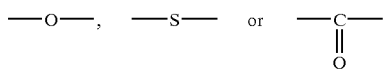

groups, the alkylidene radicals of the formula:

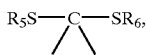

wherein $R_5$ and $R_6$ are $C_1$–$C_5$ alkyl radicals, the radicals of the formula:

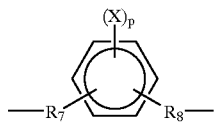

wherein $R_7$ and $R_8$ are linear or branched $C_1$–$C_5$ alkylene groups, that can include one or more

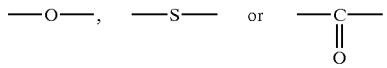

groups in their chains and X is selected from the $C_1$–$C_5$ alkyl radicals and halogens, and p is an integer from 0 to 4, and the radicals of the formula

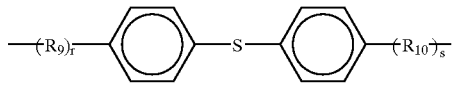

wherein $R_9$ and $R_{10}$ are linear or branched $C_1$–$C_5$ alkyl radicals, that can include in their chains one or more

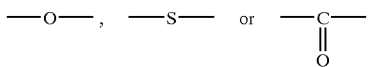

groups and r and s are 0 or 1.

Preferred divalent R radicals may include the radicals:

$(CH_2)_x$ where x is an integer from 2 to 8,

—$(CH_2CH_2O)_yCH_2CH_2$— radicals where y is an integer from 1 to 4,

—$(CH_2CH_2S)_zCH_2CH_2$— radicals where z is an integer from 1 to 4,

—$(CH_2)_{u'}(S(CH_2)_{v'})_{x'}S$—$(CH_2)_{w'}$ radicals where x' is 0 or 1 and u', v', w' are integers from 2 to 6, the radicals of the formula:

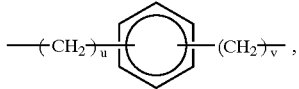

wherein u and v are integers from 1 to 4,

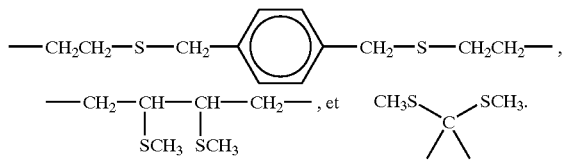

The particularly preferred divalent R radicals are:

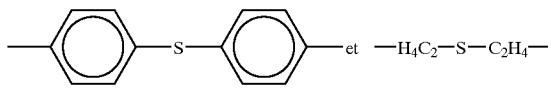

Divalent monomers of the formula (I) are disclosed, inter alia, in EP-A-273,661, EP-A-273,710, EP-A-384,725.

The trivalent R radicals of the monomers of the formula (I) may include $C_3$–$C_{10}$ alkyltriyl radicals that can include in their chains one or more

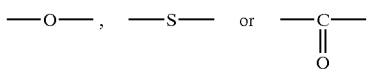

groups, the trivalent alkylaryl radicals the alkyl chains of which can include one or more —S— or —O— groups, and the trivalent aryl groups.

The trivalent R radicals or higher valency radicals may include:

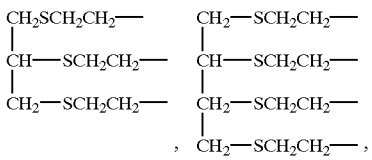

etc.

The monomers of formula (I) being recommended in the present invention may include:

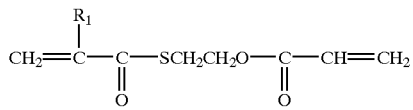

S-2-acryloyloxyethylthio(meth)acrylate,

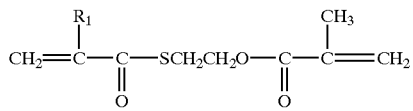

S-2-methacryloyloxyethylthio(meth)acrylate,

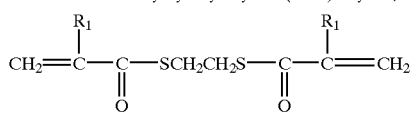

1,2-bis[(meth)acryloylthio]ethane,

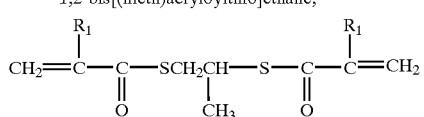

1,2-bis[(meth)acryloylthio]propane,

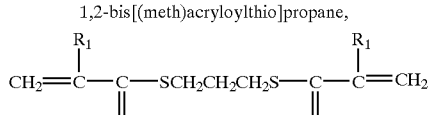

1,3-bis[(meth)acryloylthio]propane,

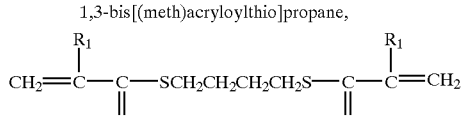

1,4-bis[(meth)acryloylthio]butane,

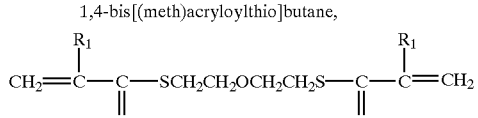

bis-2-[(meth)acryloylthioethyl]ether,

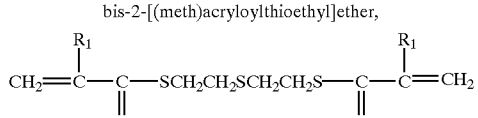

bis-2-[(meth)acryloylthioethyl]sulfide,

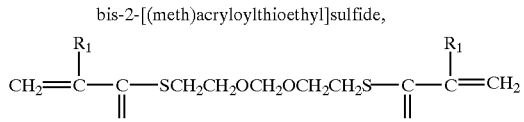

bis-2-[(meth)acryloylthioethoxy]methane,

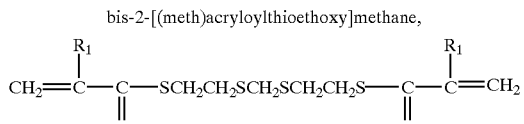

bis-2-[(meth)acryloylthioethylthio]methane,

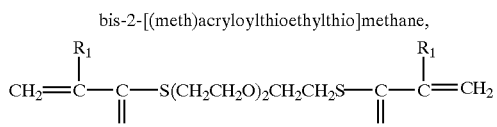

1,2-bis-[2-(meth)acryloylthioethoxy]ethane,

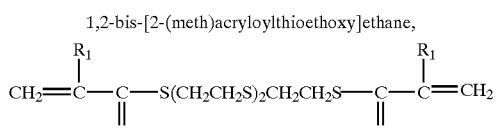

1,2-bis-[2-(meth)acryloylthioethylthio]ethane,

-continued $$CH_2=\overset{R_1}{\underset{}{C}}-\underset{\underset{O}{\|}}{C}-S(CH_2CH_2O)_3CH_2CH_2S-\underset{\underset{O}{\|}}{C}-\overset{R_1}{\underset{}{C}}=CH_2$$

bis-[2-(2-(meth)acryloylthioethoxy)ethyl]ether, $$CH_2=\overset{R_1}{\underset{}{C}}-\underset{\underset{O}{\|}}{C}-S(CH_2CH_2S)_3CH_2CH_2S-\underset{\underset{O}{\|}}{C}-\overset{R_1}{\underset{}{C}}=CH_2$$

bis-[2-(2-(meth)acryloylthioethylthio)ethyl]sulfide,

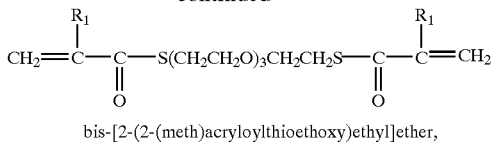

1,4-bis[(meth)acryloylthio]benzene,

1,4-bis[(meth)acryloylthiomethyl]benzene, $$CH_2=\overset{R_1}{\underset{}{C}}-\underset{\underset{O}{\|}}{C}-S-CH_2-CH_2-S-CH_2-\bigcirc$$

Benzylthioethylthio(meth)acrylate, $$CH_2=\overset{R_1}{\underset{}{C}}-\underset{\underset{O}{\|}}{C}-SCH_2\overset{SCH_3}{\underset{}{CH}}-\overset{SCH_3}{\underset{}{CH}}-CH_2-S-\underset{\underset{O}{\|}}{C}-\overset{R_1}{\underset{}{C}}=CH_2$$

1,4-[bis(meth)acryloylthio]-2,3-dimethylthiobutane,

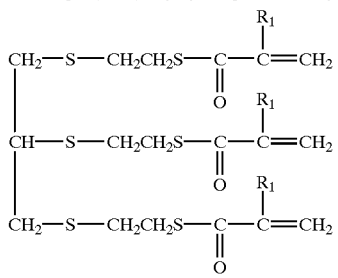

1,2,3-tris[(meth)acryloylthioethyl]thiolpropane, and

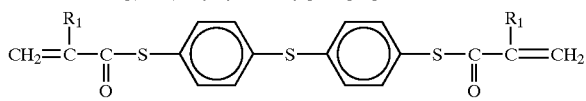

bis[(meth)acryloylthiophenyl]sulfide, where $R_1$ is a hydrogen atom or a methyl group.

The thio(meth)acrylate monomer(s) are preferably selected amongst non aromatic thio(meth)acrylate monomers.

A preferred class of thio(meth)acrylate monomers includes the monomers of the formula:

$$H_2C=\overset{R_1}{\underset{}{C}}-\underset{\underset{}{\overset{O}{\|}}}{C}-S-Y-S-\underset{\underset{}{\overset{O}{\|}}}{C}-\overset{R_1}{\underset{}{C}}=CH_2 \qquad (II)$$

wherein Y is a linear or branched $C_2$–$C_{12}$ alkylene group, a $C_3$–$C_{12}$ cycloalkylene group, a $C_6$–$C_{14}$ arylene group or a $C_7$–$C_{26}$ alkarylene group, where the Y carbon chains can be interrupted by one or more oxygen and/or sulfur atoms and $R_1$ is hydrogen or a methyl group, the monomers of the formula:

$$H_2C=\overset{R_1}{\underset{}{C}}-\underset{\underset{}{\overset{O}{\|}}}{C}-S-Y-S\mathord{-}\!\!\left[CH_2-\overset{R_1}{\underset{}{CH}}-\underset{\underset{}{\overset{O}{\|}}}{C}-S-Y-S\right]_{\!n}\!\!\mathord{-}\underset{\underset{}{\overset{O}{\|}}}{C}-\overset{R_1}{\underset{}{C}}=CH_2 \qquad (III)$$

wherein $R_1$ and Y are defined as above, and n is an integer from 1 to 10, preferably 1 to 6, and the mixtures thereof.

A particularly preferred monomer of the formula (II) has the following formula:

$$H_2C=\overset{CH_3}{\underset{}{C}}-\underset{\underset{}{\overset{O}{\|}}}{C}-S-CH_2-CH_2-S-\underset{\underset{}{\overset{O}{\|}}}{C}-\overset{CH_3}{\underset{}{C}}=CH_2 \qquad (IV)$$

A particularly preferred monomer of the formula (III) has the following formula:

$$H_2C=\overset{CH_3}{\underset{}{C}}-\underset{\underset{}{\overset{O}{\|}}}{C}-S-CH_2-CH_2-S-\underset{\underset{}{\overset{O}{\|}}}{C}-\overset{CH_3}{\underset{}{CH}}-CH_2-S-CH_2-CH_2-S-\underset{\underset{}{\overset{O}{\|}}}{C}-\overset{CH_3}{\underset{}{C}}=CH_2 \qquad (V)$$

In a preferred embodiment of the invention, the component (a) includes a mixture of monomers of formulae (IV) and (V) and optionally a monofunctional monomer of the formula:

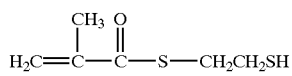
(VI)

In the preferred mixture, the monomer of formula (IV) represents 10% to 50% by weight, the monomer of formula (V) 30% to 60% by weight and the monomer of formula (VI) 0 to 20% by weight based on the mixture total weight.

The monomers of formulae (II) and (III) are disclosed in U.S. Pat. No. 5,384,379.

The second essential component of the polymerizable monomer compositions according to the invention comprises at least one high Abbe number monomer.

By "high Abbe number monomer", it is understood a monomer able to generate, through homopolymerization, a transparent polymer with a high Abbe number, i.e. of at least 45, and preferably at least 50.

The high Abbe number monomer preferably comprises at least a non aromatic hydrocarbon cyclic or polycyclic radical.

The high Abbe number monomer is preferably selected amongst at least one of the monomers of the following formulae:

w" is an integer from 1 to 3,

X" is an integer from 0 to 3, y" is an integer from 0 to 3, providing $x''-y'' \geq 1$, k" is an integer from 0 to 6, l" is an integer from 0 to 6, r" is an integer from 0 to 6, s" is an integer from 0 to 6, z" is an integer from 0 to 3, and t" is an integer from 0 to 3.

The particularly preferred high Abbe number monomers are selected amongst the monomers of the formulae:

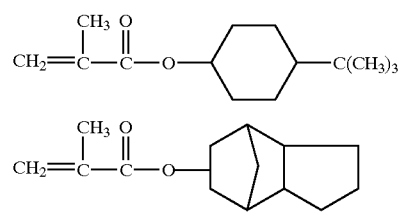

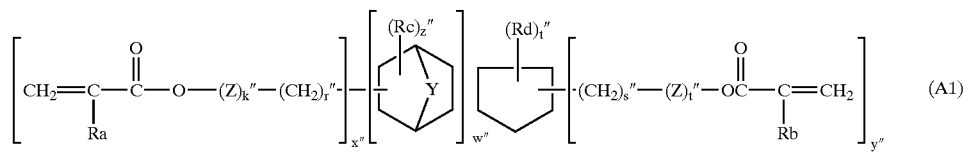 (A1)

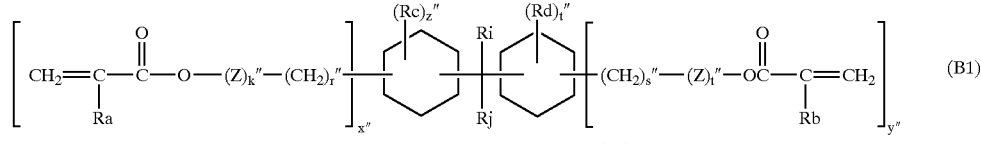 (B1)

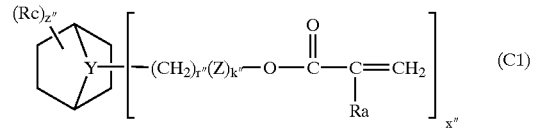 (C1)

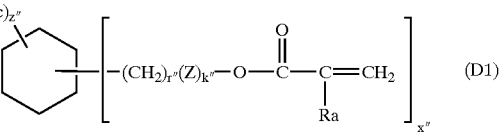 (D1)

Where:
Y is a divalent radical selected from —O—, —CH$_2$—, —C(CH$_3$)$_2$—, —C(H)(CH$_3$)—, Z is a divalent radical selected amongst —(CH$_2$)$_p$—O—, p being an integer from 1 to 4, and

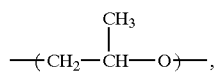

$R_a$, $R_b$ are H or CH$_3$, $R_c$, $R_d$ are, independently from one another, a linear or branched alkyl radical with 1 to 6 carbon atoms, $R_i$, $R_j$ are, independently from one another, a linear or branched alkyl radical with 1 to 10 carbon atoms, -continued

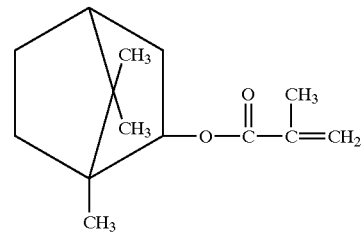

-continued

CH₂=C(CH₃)—C(O)—OCH₂—[norbornane structure]—CH₂—O—C(O)—C(CH₃)=CH₂

Generally speaking, the preferred high Abbe number monomers are difunctional di(meth)acrylate monomers.

The component (c) is an aromatic polyvinyl monomer or a mixture of aromatic polyvinyl monomers.

In the present invention, the term "vinyl" is used in the strict sense and does not encompass functions of the acrylic or methacrylic type.

The aromatic polyvinyl monomer may be a monomer of the formula:

$$[(CH_2=CH)(A)_{a'}]_{b'} B$$

where B is selected amongst:

[structures showing: substituted benzene, naphthalene, diphenylsulfone, diphenylmethane, biphenyl, fluorene-type, triazine, cyclotriphosphazene — all bearing Y' substituents]

A is a divalent chain selected amongst:

—CH₂—,  —(CH₂)$_{c'}$—O—,  —CH₂—C(CH₃)—O—   or
—(CH₂—CH₂—S)—,

Y' is a hydrogen atom or an halogen,
a'=0, 1 or 2,
b' is an integer from 2 to 6, and
c' is an integer from 1 to 4.

The preferred aromatic polyvinyl monomers are divinylbenzene, divinylnaphthalene and the derivates thereof, more particularly divinylbenzene.

The polythiol monomers of component (d) of the compositions according to the invention are well known in the art and can be represented with the formula $R'(SH)_{n'}$, wherein n' is an integer of 2 or more, preferably from 2 to 5, and R' is an aliphatic, aromatic or heterocyclic radical.

The polythiol compound is preferably a dithiol, trithiol or tetrathiol compound, more particularly a high Abbe number polythiol.

These polythiol compounds are well known in the art and are disclosed, among others, in EP 394,495.

The dithiols useful in the present invention may include 9,10-anthracenedimethanethiol, 1,11-undecanedithiol, 4-ethyl-benzene-1,3-dithiol, 1,2-ethanedithiol, 1,8-octanedithiol, 1,18-octadecanedithiol, 2,5-dichlorobenzene-1,3-dithiol, 1,3-(4-chlorophenyl)propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithioundecane-1,11-dithiol, dithiopentaerythritol, dithiothreitol, 1,3-diphenylpropane-2,2-dithiol, 1,3-dihydroxy-2-propyl-2',3'-dimercaptopropylether, 2,3-dihydroxypropyl-2',3'-dimercaptopropylether, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxy-phenyl)propane-2,2-dithiol, 3,4-dimethoxybutane-1,2-dithiol, 10,11-dimercaptoundecanoic acid, 6,8-dimercapto-octanoic acid, 2,5-dimercapto-1,3,4-thiadiazole, 2,2'-dimercapto-biphenyl, 4,4'-dimercaptobiphenyl, 4,4'-dimercaptobibenzyl, 3,4-dimercaptobutanol, 3,4-dimercaptobutylacetate, 2,3-dimercapto-1-propanol, 1,2-dimercapto-1,3-butanediol, 2,3-dimercaptopropionic acid, 1,2-dimercaptopropylmethylether, 2,3-dimercaptopropyl-2',3'-dimethoxypropylether, 3,4-thiophenedithiol, 1,10-decanedithiol, 1,12-dodecanedithiol, 3,5,5-trimethyl-hexane-1,1-dithiol, 2,5-toluenedithiol, 3,4-toluenedithiol, 1,4-naphthalenedithiol, 1,5-naphthalenedithiol, 2,6-naphthalenedithiol, 1,9-nonanedithiol, norbornene-2,3-dithiol, bis(2-mercaptoisopropyl)ether, bis(11-mercaptoundecyl)sulfide, bis(2-mercaptoethyl)ether, bis(2-mercaptoethyl)sulfide, bis (18-mercatooctadecyl)sulfide, bis (8-mercaptooctyl)sulfide, bis(12-mercaptodecyl)sulfide, bis (9-mercaptononyl)sulfide, bis(4-mercaptobutyl)sulfide, bis (3-mercaptopropyl)ether, bis(3-mercaptopropyl)sulfide, bis (6-mercaptohexyl)sulfide, bis(7-mercaptoheptyl)sulfide, bis (5-mercaptopentyl)sulfide, 2,2'-bis(mercaptomethyl)acetic acid, 1,1-bis(mercaptomethyl)cyclohexane, bis (mercaptomethyl)durene, phenylmethane-1,1-dithiol, 1,2-butane-dithiol, 1,4-butanedithiol, 2,3-butanedithiol, 2,2-butanedithiol, 1,2-propanedithiol, 1,3-propanedithiol, 2,2-propanedithiol, 1,2-hexanedithiol, 1,6-hexanedithiol, 2,5-hexanedithiol, 1,7-heptanedithiol, 2,6-heptanedithiol, 1,5-pentanedithiol, 2,4-pentanedithiol, 3,3-pentanedithiol, 7,8-heptadecanedithiol, 1,2-benzenedithiol, 1,3-benzenedithiol, 1,4-benzenedithiol, 2-methylcyclohexane-1,1-dithiol, 2-methylbutane-2,3-dithiol, ethyleneglycol dithioglycolate, ethylene glycol bis(3-mercaptopropionate). The trithiols may include 1,2,3-propanetrithiol, 1,2,4-butanetrithiol, trimethylolpropanetrithiol glycolate, trimethylolpropane tris (3-mercaptopropionate), pentaerythritol trithioglycolate, pentaerythritol tris(3-mercaptopropionate), 1,3,5-benzenetrithiol and 2,4,6-mesitylenetrithiol.

The polythiols useful in the compositions of the present invention may further include neopentane tetrathiol, 2,2'-bis-(mercaptomethyl)-1,3-propanedithiol, pentaerythritol tetrakis (3-mercaptopropionate), pentaerythritol tetrakis (thioglycolate), 1,3,5-benzenetrithiol, 2,4,6-toluenetrithiol, 2,4,6-methylenetrithiol and the polythiols of the following formulae:

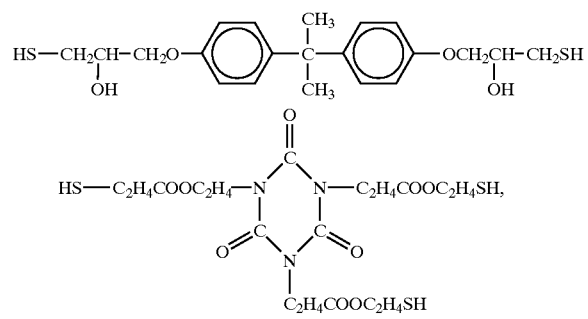

(HS CH$_2$CH$_2$ COO CH$_2$)$_3$ C C$_2$H$_5$ (TTMP), and 4-mercaptomethyl-3,6-dithia-1,8-octanedithiol.

The preferred polythiols according to the present invention are ethyleneglycol bis(thioglycolate), trimethylolpropane tris(3-mercaptopropionate), pentaerythritol tetrakis thiopropionate (PETP), 4- mercaptomethyl-3,6-dithia-1,8-octanedithiol (MDO), bis(2-mercaptoethyl)sulfide (DMDS) and pentaerythritol tetrakis thioglycolate (PETG).

As previously indicated, besides the monomers of components (a), (b), (c) and (d), the compositions according to the invention may include other copolymerizable monomers, particularly radical copolymerizable monomers.

Such monomers make it possible to match the properties of the resulting transparent substrates.

These monomers may be present in the compositions of the invention in a proportion of 0 to 30% based on the total weight of the monomers of components (a), (b), (c) and (d), preferably 0 to 20% and more preferably 0 to 10%.

Such monomers may include:
alkyl(meth)acrylates such as methyl(meth)acrylate and ethyl(meth)acrylate, cycloalkyl (meth)acrylates such as cyclohexyl (meth)acrylate and dicyclopentyl (meth)acrylate, phenyl (meth)acrylate, benzyl (meth)acrylate, naphthyl (meth)acrylates, phenoxyalkyl (meth)acrylates such as phenoxyethyl (meth)acrylate and phenoxybutyl (meth)acrylate, alkyleneglycol di(meth)acrylates such as ethyleneglycol di(meth)acrylate and propyleneglycol di(meth)acrylate, polyalkyleneglycol di(meth)acrylates such as polyethyleneglycol di(meth)acrylates and polybutyleneglycol di(meth)acrylates, neopentylglycol di(meth)acrylate and the derivates of bisphenol-A di(meth)acrylates, poly(meth)acrylate urethanes.

The bisphenol-A di(meth)acrylates compounds may include the compounds of the formula:

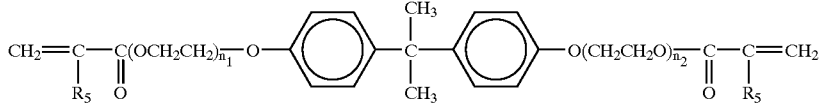

wherein $R_5$ is H or $CH_3$ and $n_1+n_2$ has a mean value in the range of 0 to 40.

Preferred compounds having the above-mentioned formula are those for which $R_5=CH_3$ and $\overline{n_5+n_2}=2,6$ (EBADMA), $\overline{n_1+n_2}=4$ (DBADMA), $\overline{n_{1+n_2}}=10$ (OBADMA) and $\overline{n_{1+n_2}}=30$.

The polymerizable compositions according to the invention may also include conventionally used additives in polymerizable compositions for moulding optical items, more particularly spectacle glasses, in the conventional proportions, namely inhibitors, dyes, UV absorbers, perfumes, deodorants, antioxidants and anti-yellowing additives.

More particularly, the anti-yellowing agents such as those disclosed in the U.S. Pat. Nos. n° 5,442,022, 5,545,828, 5,702,825 and 5,741,831 may be used.

The preferred anti-yellowing agent is 3-methyl 2-butene 1-ol (MBOL).

Triphenylphosphine (TPP) and Irganox® 1010 (pentaerythritol-tetrakis[3(3,5-di-tert.-butyl-4-hydroxyphenyl)propionate] (CG 1010) may be mentioned as preferred examples of antioxidant agents.

Perfumes make it possible to hide the smell from the compositions, more particularly in surfacing operations.

The compositions according to the invention generally include polymerization initiators, preferably photoinitiators or mixtures of photoinitiators and thermal initiators, in a proportion of 0.001% to 5% by weight based on the total weight of the polymerizable monomers present in the composition.

The photoinitiators useful in the polymerizable compositions according to the invention may include more particularly 2,4,6-trimethylbenzoyldiphenyl-phosphine oxide (TPO), 1-hydroxycyclo-hexylphenylketone, 2,2-dimethoxy-1,2-diphenylethane 1-one, alkylbenzoylethers, the commercially available photoinitiator from Ciba-Geigy Corporation under the tradename CGI 1700, which is a 25/75 mixture of a compound of the formula:

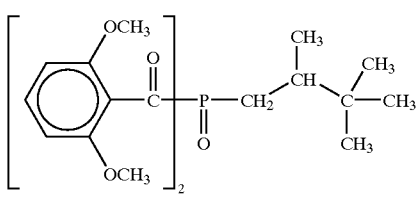

(A)

and a compound of the formula:

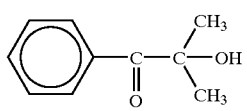

(B)

and the CGI 1850 photoinitiator commercially available from Ciba Geigy Corporation, which is a 50/50 mixture (by weight) of compound A and Irgacure® 184 of the formula:

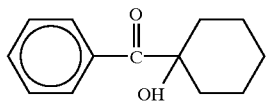

Another preferred photoinitiator is CGI 819 from Ciba Geigy Corporation of the formula:

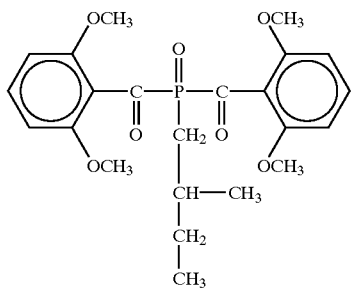

Other photoinitiators of the same type may also be used, such as that of the formula:

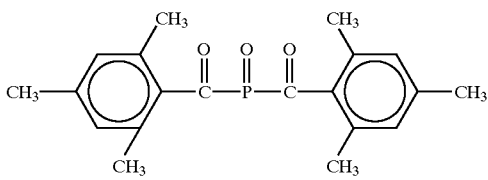

As previously mentioned, the preferred polymerizable compositions according to the invention are photopolymerizable compositions comprising one or more photoinitiators.

Still preferably, the polymerizable compositions according to the invention are photo- and thermopolymerizable compositions including both a polymerization photoinitiator and a polymerization thermal initiator.

The thermal polymerization initiators are compounds which are well known in the art and may include peroxides, such as benzoyl peroxide, cyclohexyl peroxydicarbonate, isopropyl peroxydicarbonate and tert-butylperoxy(2-ethyl hexanoate).

The present invention will now be described more in details in the following examples. In such examples, unless otherwise mentioned, all the percentages and parts are expressed in weight.

Examples 1 to 6

1) Preparation of the Polymerizable Compositions

Six compositions of polymerizable monomers according to the invention have been formulated by mixing the monomers indicated in table I hereunder.

TABLE I

| | Comp. 1 | Comp. 2 | Comp. 3 | Comp. 4 | Comp. 5 | Comp. 6 |
|---|---|---|---|---|---|---|
| | (Parts by weight) | | | | | |
| Thiométhacrylate | | | | | | |
| PLEX ® 6856 High Abbe number monomer | 58.2 | 58.1 | 56.9 | 52.2 | 58.2 | 57 |
| DCPA | 22.2 | 22.2 | 20.9 | 22.3 | 22.2 | 21.8 |
| DVB | 3.6 | 3.6 | 3.9 | 4.7 | 3.6 | 3.6 |
| Polythiol monomer | | | | | | |
| PETG Other monomer | 15.3 | 10.4 | 17.9 | 12.4 | 8.3 | 6.9 |
| DMDS Anti-yellowing agent | — | 5 | — | 7.7 | 7.0 | 10.0 |
| MBOL UV absorber | 0.30 | 0.30 | — | 0.3 | 0.3 | 0.3 |
| UV 5411 Photoinitiator | 0.1 | 0.1 | 0.1 | 0.1 | 0.1 | 0.1 |
| CGI 819 | 0.3 | 0.3 | 0.3 | 0.3 | 0.3 | 0.3 |

PLEX ® 6856: monomeric mixture of formulae IV, V, and VI, in the proportions, respectively, of 36%, 46% and 4.5% by weight based on the total weight of monomers IV + V + VI, which is commercially available from Rohm Corporation
DCPA: dicyclopentadiene dimethacrylate
DVB: high purity divinylbenzene (DVB 960 from Shin Nakamura)
PETG: pentaerithrytol tetrakis (thioglycolate)
DMDS: bis(2-mercaptoethyl)sulfide
MBOL: 3-methyl-2-butene-1-ol
UV 5411: UV absorber of the formula 2-(2-hydroxy-5-t-octylphenyl) benzotriazole.

2) Casting Process

The compositions prepared as above mentioned are cast into moulds made of two mineral glass mould parts, soda cleaned beforehand and assembled in parallel with a 2 mm BARNIER adhesive strip. The cast is carried out with the following steps of:

taking out the composition using a (20 ml) sterile syringe,
partial disassembling the adhesive strip for creating an opening,
inserting the syringe tip into the opening,
injecting the composition into the mould, and
repositioning the adhesive strip for sealing the mould.

3) Photochemical Prepolymerization

The filled moulds are placed in a photochemical polymerization oven provided with two U.V. PRIMA lamps (mercury lamps) positioned on either side at equal distance from the moulds and each mould receives a 12 mW/cm² illumination for 30 seconds.

Infrared measures make it possible to follow the conversion of the double (meth)acrylic bonds depending on the UV irradiation time.

4) Photochemical Polymerization

The assembly is then placed in a UV (mercury lamp) oven and is subjected to an increasing illumination up to a value of 200 mW/cm², for a two minute period. The glass pieces are then released and checked using an arc lamp. A final annealing allows to complete the polymerization and to release the residual stresses of the resulting substrate.

The features of the resulting substrates are indicated in table II.

The YI yellowing index has been measured using the ASTM D 1925 standard for 2 mm thick glasses.

Tg measurement is done using DMA (dynamic mechanical analysis) on a planar 5.2×1×2 cm (thickness) sample.

The test is performed in a 3 point bending.

Tg corresponds to the ratio maximum.

E" (loss modulus)/E'(conservation modulus)

The refractive indices $n_e$ ($\lambda$=546 nm) and the Abbe numbers $\gamma_e$ have been determined at 25° C. with a Bellingham-Stanley Limited Abbe 60/TR refractometer using several lamps (sodium, mercury and cadmium) as light sources.

The DMA analyses have been carried out with a Rheometrics Solid Analyzer RSA II apparatus on 52×10×2 mm samples, at a 1 Hz frequency and in a temperature range of −50° C. to 170° C. at 2° C./minute.

The results are given in table II.

TABLE II

|  | Comp. 1 | Comp. 2 | Comp. 3 | Comp. 4 | Comp. 5 | Comp. 6 |
|---|---|---|---|---|---|---|
| $n_e$ | 1.587 | 1.592 | 1.587 | 1.591 | 1.593 | 1.596 |
| $\gamma_e$ | 40 | 40 | 40.5 | 41 | 40 | 40 |
| d | 1.27 | 1.27 | 1.28 | 1.27 | 1.27 | 1.27 |
| YI | 1.2 | 1.2 | 1.9 | 1.5 | 1.7 | 1.6 |
| E' 25° C. (Mpa) | 3500 | 3260 | 3500 | 3300 | — | 3200 |
| E' 100° C. (Mpa) | 860 | 450 | 635 | 185 | — | 190 |
| Tg (° C.) | 104 | 96 | 102 | 92 | — | 88 |

A resistance test to a mechanical stress of a quasi static type is performed according to the NF EN ISO 14889 standard on 12 glass pieces corresponding to composition no. 6 in table I hereabove and having a central average thickness of 1.22 mm.

All the glass pieces being tested satisfie the corresponding test successfully (no starred glass, no material loss).

An impact resistance test (according to the ball fall FDA American standard (16 g, 1.27 m)) is performed on a sample of 12 glass pieces corresponding to composition no. 6 in table I hereabove and having a central thickness of 1.23 +/−0.03 mm.

The 12 tested glass pieces satisfie the FDA test successfully (no break, no starring).

Examples 7 to 12

Six compositions of polymerizable monomers according to the invention have been formulated from a mixture of monomer of formula (IV) and monomer of formula (VII) in respective amounts of 35% and 65% by weight (TMA from PPG).

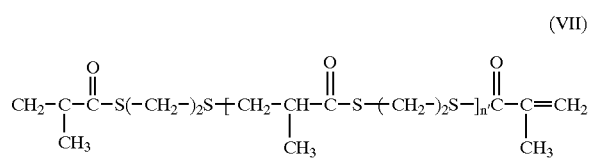

(VII)

where n' is an integer from 1 to 10.

The compositions are indicated in Table III.

TABLE III

|  | Comp. 7 | Comp. 8 | Comp. 9 | Comp. 10 | Comp. 11 | Comp. 12 |
|---|---|---|---|---|---|---|
| Thiomethacrylate TMA (PPG) | 59.5 | 62.5 | 63.6 | 58.1 | 61 | 63 |
| High Abbe number monomer DCPA | 21.8 | 21.9 | 21.9 | 22.2 | 22 | 20 |
| DVB | 3 | 3 | 4 | 5.4 | 3 | 3 |
| Polythiol monomer |  |  |  |  |  |  |
| PETG | 15 | 12 | 9.9 | 9.2 | 14 | — |
| DMDS | — | — | — | 4.5 | — | 4 |
| Other monomer OBADMA |  |  |  |  |  | 10 |

All formulations contain:

0.3% MBOL (anti yellowing agent)

0.3% CGI 819 (photoinitiator)

0.1% UV 5411 (UV absorber)

Casting, prepolymerisation, thermal polymerisation and annealing process, as well as the characterizations made are identical to those disclosed in connection with examples 1 to 6.

The results are given in Table IV.

TABLE IV

|  | Comp. 7 | Comp. 8 | Comp. 9 | Comp. 10 | Comp. 11 | Comp. 12 |
|---|---|---|---|---|---|---|
| $n_e$ | 1.593 | 1.594 | 1.595 | 1.596 | 1.594 | 1.595 |
| $\gamma_e$ | 40–41 | 39–40 | 39 | 40 | 40 | 39 |
| d | 1.29 | 1.29 | 1.28 | 1.27 | 1.29 | 1.26 |
| YI (20/10) | 1.55 | 1.6 | 2.1 | 1.6 | 1.5 | 1.7 |
| E' 25° C. (Mpa) | 2960 | 3000 | 3000 | 2700 | 2200 |  |
| E' 100° C. (Mpa) | 110 | 170 | 360 | 110 | 120 | — |

TABLE IV-continued

|  | Comp. 7 | Comp. 8 | Comp. 9 | Comp. 10 | Comp. 11 | Comp. 12 |
|---|---|---|---|---|---|---|
| Tg (° C.) | 79 | 83 | 100 | 82 | 84 |  |
| Impact (FDA) |  |  |  | Thickness at center = 1.26 mm 20 glasses/ 20 OK | Thickness at center = 1.25 mm 31 glasses/ 31 OK |  |

What is claimed is:

1. A polymerizable monomer composition comprising:
   (a) at least 40 parts by weight of at least one thio(meth)acrylate monomer,
   (b) at least one high Abbe number monomer,
   (c) at the most 20 parts by weight of at least one aromatic polyvinyl monomer, and
   (d) at least one polythiol;
   for a total of 100 parts by weight of these components in the polymerizable monomer composition.

2. The composition of claim 1, further defined as comprising at least 50 parts by weight of at least one thio(meth)acrylate monomer.

3. The composition of claim 1, further defined as comprising at the most 15 parts by weight of an aromatic polyvinyl monomer.

4. The composition of claim 3, further defined as comprising at the most 10 parts by weight of an aromatic polyvinyl monomer.

5. The composition of claim 1, further defined as comprising a total of 10 to 40 parts by weight of one or more high Abbe number monomer.

6. The composition of claim 1, further defined as comprising a total of 5 to 20 parts by weight of one or more polythiol.

7. The composition of claim 1, further defined as including 0.5 to 10 parts by weight of the aromatic vinyl monomer.

8. The composition of claim 1, further comprising up to 30 parts by weight of at least one additional copolymerizable monomer, in addition to the 100 parts by weight of the at least one thio(meth)acrylate monomer, the at least one high Abbe number monomer, the aromatic polyvinyl monomer, and the at least one polythiol.

9. The composition of claim 8, wherein the at least one additional copolymerizable monomer is radical copolymerizable monomer.

10. The composition of claim 1, wherein the thio(meth)acrylate monomer is of the formula:

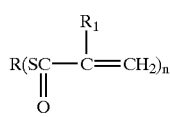

wherein
   R is a linear or branched, monovalent or polyvalent aliphatic hydrocarbon radical, or a monovalent or polyvalent aromatic group, directly linked to the sulfur atom of the thio(meth)acrylate group(s) with an aromatic ring or by means of a linear alkyl chain, the R radical comprising optionally in its chain one or more groups of formula

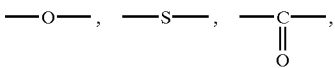

$R_1$ is a hydrogen or —$CH_3$, and
n is an integer from 1 to 6.

11. The composition of claim 10, wherein n is an integer from 1 to 3.

12. The composition of claim 1, wherein in the thio(meth)acrylate monomer is non-aromatic.

13. The composition of claim 1, wherein in the at least one thio(meth)acrylate monomer is a monomer of the formula:

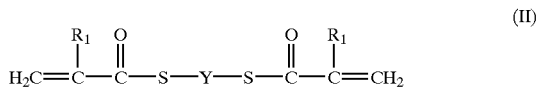

wherein Y is a linear or branched $C_2$–$C_{14}$ arylene group or a $C_7$–$C_{26}$ alkylene group, a $C_3$–$C_{12}$ cycloalkylene group, a $C_6$–$C_{14}$ arylene group, or a $C_7$–$C_{26}$ alkarylene group, the carbon chains of Y can be interrupted by one or more oxygen and/or sulfur atoms and $R_1$ is hydrogen or a methyl group, or a monomer of formula:

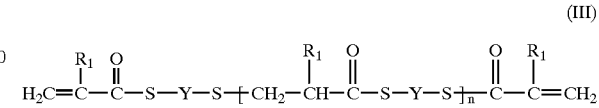

wherein $R_1$ and Y are defined as above and n is an integer from 1 to 10, or a mixture thereof.

14. The composition of claim 13, wherein n is an integer from 1 to 6.

15. The composition of claim 13, wherein in the at least one thio(meth)acrylate monomer is further defined as a mixture of:

(1) 35% by weight of a monomer of formula:

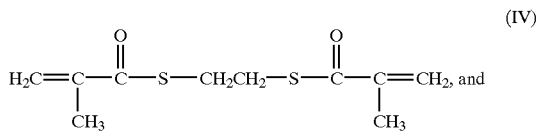

(2) 65% by weight of a monomer of formula:

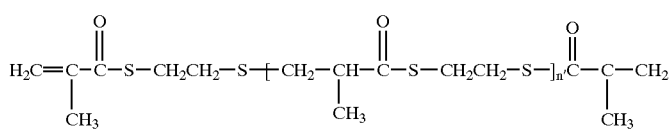

(VII)

where n' is an integer from 1 to 10.

16. The composition of claim 13, wherein the at least one thio(meth)acrylate monomer is further defined as a mixture in percent by weight based on the total weight of the mixture of:

(1) 10% to 50% of a monomer of the formula:

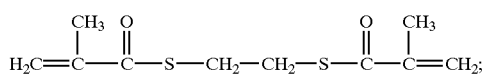

(2) 30% to 60% of a monomer of the formula:

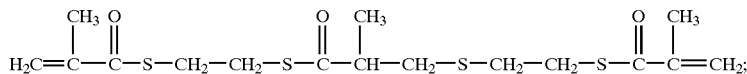

(3) 0 to 20% of a monomer of the formula:

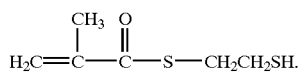

17. The composition of claim 1, wherein in the at least one high Abbe number monomer is of the formula:

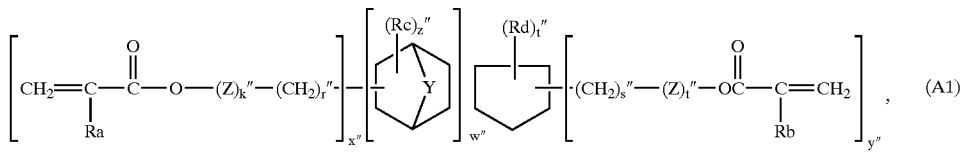

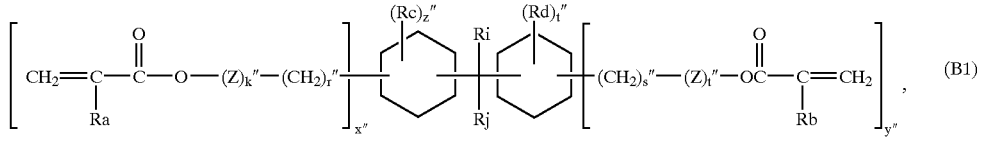

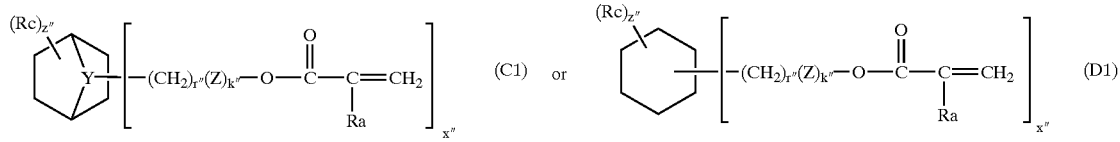

wherein Y is a divalent radical of formula —O—, —CH$_2$—, —C(CH$_3$)$_2$—, —C(H)(CH$_3$)—, Z is a divalent radical of formula —(CH$_2$)$_p$—O—, p being an integer from 1 to 4, and

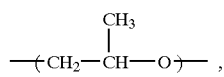

$R_a$, $R_b$ are H or CH$_3$, $R_c$, $R_d$ are, independently from one another, a linear or branched alkyl radical with 1 to 6 carbon atoms, $R_i$, $R_j$ are, independently from one another, a linear or branched alkyl radical with 1 to 10 carbon atoms, w" is an integer from 1 to 3, x" is an integer from 0 to 3, y" is an integer from 0 to 3, providing x"+y">1, k" is an integer from 0 to 6, l" is an integer from 0 to 6, r" is an integer from 0 to 6, s" is an integer from 0 to 6, z" is an integer from 0 to 3, t" is an integer from 0 to 3.

18. The composition of claim 17, wherein in the at least one high Abbe number monomer is a monomer of the formula:

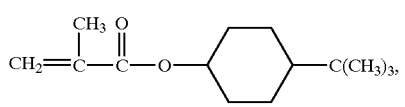

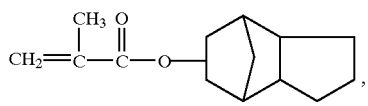

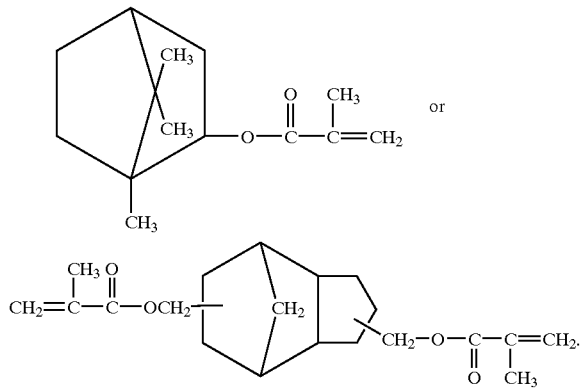

19. The composition of claim 1, wherein in the at least one aromatic polyvinyl monomer is a monomer of the formula:

where B is:

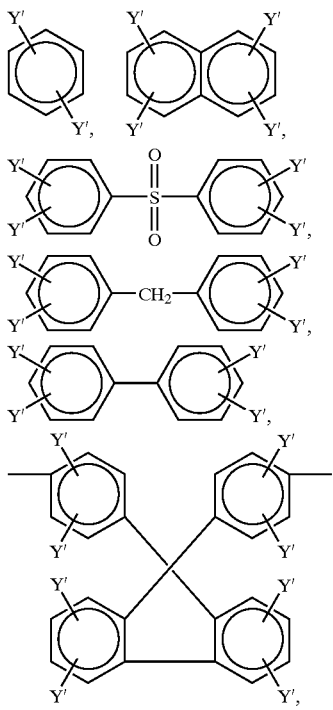

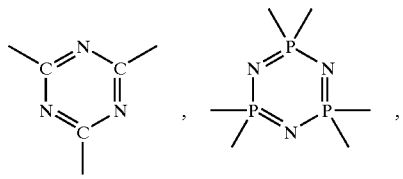

A is a divalent chain of formula:

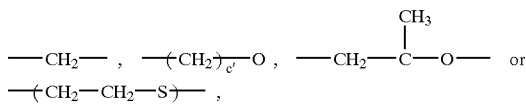

Y' is a hydrogen atom or an halogen
a' =0, 1 or 2,
b' is an integer from 2 to 6, and
c' is an integer from 1 to 4.

20. The composition of claim 19, wherein in the at least one aromatic polyvinyl monomer is divinylbenzene, divinylnaphthalene or a derivative thereof.

21. The composition of claim 1, wherein in the at least one polythiol monomer is a monomer of the formula R'(SH)$_{n'}$, wherein R' is an aliphatic, aromatic or heterocyclic radical and n' is an integer from 2 to 5.

22. The composition of claim 21, wherein in the polythiol monomer is ethyleneglycol bis(thioglycolate), trimethylolpropane tris(3-mercaptopropionate), pentaerythritol tetrakis thiopropionate (PETP), 4-mercaptomethyl-3,6-dithia-1,8-octanedithiol (MDO), bis(2-mercaptoethyl)sulfide (DMDS) or pentaerythritol tetrakis thioglycolate (PETG).

23. The composition of claim 1, further comprising a photoinitiator and/or a thermal initiator.

24. The composition of claim 1, further defined as a photopolymerizable composition.

25. A composition prepared by polymerization of a polymerizable monomer composition comprising:
(a) at least 40 parts by weight of at least one thio(meth) acrylate monomer,
(b) at least one high Abbe number monomer,
(c) at the most 20 parts by weight of an aromatic polyvinyl monomer, and
(d) at least one polythiol;
for a total of 100 parts by weight of these components in the composition.

26. The composition of claim 1, further defined as an optical or ophthalmic lens.

* * * * *

UNITED STATES PATENT AND TRADEMARK OFFICE
CERTIFICATE OF CORRECTION

PATENT NO. : 6,518,393 B2
DATED : February 11, 2003
INVENTOR(S) : Primel et al.

It is certified that error appears in the above-identified patent and that said Letters Patent is hereby corrected as shown below:

Column 19,
Line 67, please delete "poly" and insert -- poly -- therefor.

Column 21,
Line 37, please delete

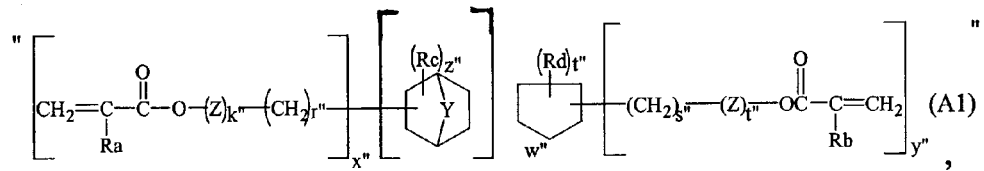

and insert

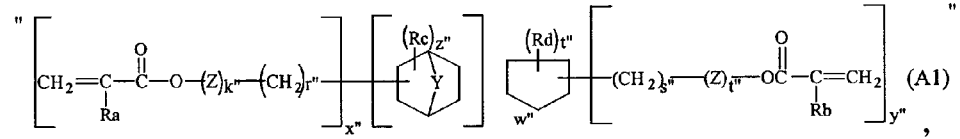

therefor.

UNITED STATES PATENT AND TRADEMARK OFFICE
CERTIFICATE OF CORRECTION

PATENT NO. : 6,518,393 B1
DATED : February 11, 2003
INVENTOR(S) : Primel et al.

It is certified that error appears in the above-identified patent and that said Letters Patent is hereby corrected as shown below:

Column 22,
Line 13, please delete "$R_1$" and insert -- $R_i$ -- therefor.

Column 23,
Line 23, please delete "$[(CH_2=CH)(A)_{a'}]_{b'}B$"

and insert

-- $[(CH_2=CH)(A)_{a'}]_{b'}B$ -- therefore.

Signed and Sealed this

Twenty-fourth Day of June, 2003

JAMES E. ROGAN
*Director of the United States Patent and Trademark Office*